United States Patent [19]

Smoczynski

[11] 4,223,918
[45] Sep. 23, 1980

[54] COLOR CODED CREDIT CARD

[76] Inventor: Frank E. Smoczynski, 101 E. Oak-Glen Dr., Bartlett, Ill. 60103

[21] Appl. No.: 925,381

[22] Filed: Jul. 17, 1978

[51] Int. Cl.³ ............................................. B42D 15/00
[52] U.S. Cl. ........................................ 283/7; 283/8 R
[58] Field of Search .......................... 40/2.2, 615, 616; 283/7, 8 R, 9 R

[56] References Cited

U.S. PATENT DOCUMENTS

| | | | |
|---|---|---|---|
| 3,546,797 | 12/1970 | Oleson | 40/615 |
| 3,601,913 | 8/1971 | Pollock | 40/2.2 |
| 3,662,156 | 5/1972 | Grosbard | 283/7 |
| 3,902,262 | 9/1975 | Colegrove et al. | 40/2.2 |
| 3,930,924 | 1/1976 | Oka et al. | 40/2.2 |
| 3,967,400 | 7/1976 | Otto | 40/2.2 |
| 4,097,279 | 6/1978 | Whitehead | 40/2.2 |

Primary Examiner—John McQuade
Attorney, Agent, or Firm—Joseph P. Gastel

[57] ABSTRACT

A color coded credit card laminate consisting of a plurality of layers of material of different colors of visible thickness laminated relative to each other and extending to all edges of the card, to thereby provide a coded color pattern visible at the edges of the card. A coded credit card laminate consisting of a plurality of layers of material laminated relative to each other including a layer of material containing metal to provide a predetermined conductivity.

11 Claims, 7 Drawing Figures

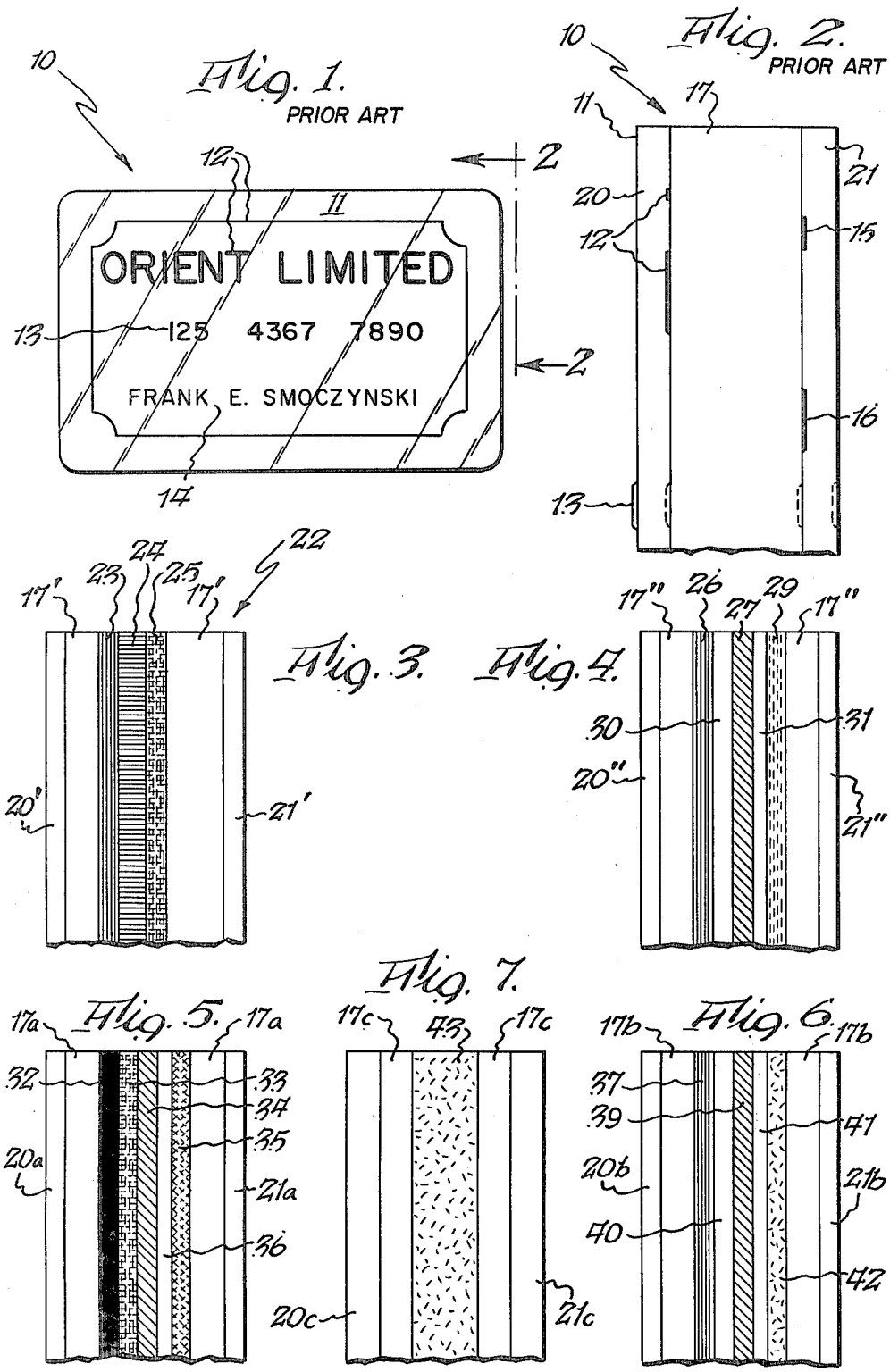

COLOR CODED CREDIT CARD

BACKGROUND OF THE INVENTION

The present invention relates to an improved credit card construction which is color coded for facilitating identification and discouraging counterfeiting.

By way of background, counterfeiting of credit cards at the present time is relatively easy and can be accomplished effectively by unsophisticated counterfeiters. In this respect, the ordinary credit card is fabricated from a 20 mil core layer of polyvinyl chloride which is printed to provide information on the front and rear of the card. Laminated to each of these layers is a 5 mil clear polyvinyl chloride sheet through which the printing can be seen. The total thickness of the card is 30 mils and it can be fabricated by the use of commercially available material. Thus, counterfeitors can obtain the basic materials for making a credit card from normal commercial channels, and with a minimum of equipment, may duplicate credit cards. It is with overcoming the foregoing ease of counterfeiting that the present invention is concerned.

SUMMARY OF THE INVENTION

It is one important object of the present invention to code a credit card in such a manner that counterfeiting thereof is made difficult.

It is another object of the present invention to provide an improved color coded credit card which can reveal the area of its issuance by visual inspection, thereby alerting a merchant to the fact that such credit card may not have issued in his particular geographical area. Other objects and attendant advantages of the present invention will readily be perceived hereafter.

The present invention relates to a color coded credit card laminate comprising a plurality of layers of material of different colors of visible thickness laminated relative to each other and extending to the edge of said card to thereby provide a coded color pattern at the edge of said card. The present invention also relates to a coded credit card laminate comprising a plurality of layers of material laminated to each other including a layer of material containing metal to provide a predetermined conductivity which can be sensed by suitable detecting apparatus. The various aspects of the present invention will be more fully understood when the following portions of the specification are read in conjunction with the accompanying drawings wherein:

BRIEF DESCRIPTION OF THE DRAWINGS

FIG. 1 is a view of the front face of a typical credit card;

FIG. 2 is an enlarged fragmentary end elevational view taken in the direction of arrows 2—2 of FIG. 1;

FIG. 3 is an enlarged fragmentary end elevational view of an improved color coded credit card made in accordance with the principles of the present invention;

FIG. 4 is a fragmentary enlarged end elevational view of another embodiment of the improved color coded credit card of the present invention;

FIG. 5 is an enlarged fragmentary end elevational view of still another embodiment of the present invention;

FIG. 6 is an enlarged fragmentary end elevational view of an improved coded credit card having a plurality of layers of different colors visible from the edge and also having a layer of a predetermined metallic content; and FIG. 7 is an enlarged fragmentary end elevational view of still another embodiment of the present invention containing a layer of a predetermined metal content.

DESCRIPTION OF THE PREFERRED EMBODIMENTS

The conventional credit card 10 of FIGS. 1 and 2 is fabricated from a core layer 17 of white high impact polyvinyl chloride which is 20 mils thick. In addition, there is an overlaminate layer 20 of clear high impact polyvinyl chloride which constitutes the front surface of the card, and there is an overlaminate layer 21 of high impact clear polyvinyl chloride which constitutes the rear surface of the card. Layers 20 and 21 are each 5 mils thick so that the thickness of the entire card is 30 mils. Printing 12 on the surface of core layer 17 can be seen from the front 11 of the card through overlaminate layer 20. Printing 15 and 16 on core layer 17 can be seen through overlaminate layer 21. In addition, the card is embossed with a series of raised numbers 13 and with the card holder's name 14.

As noted briefly above, the material for layers 17, 20 and 21 is commercially available. Thus, counterfeiters can obtain such materials, print on it, laminate it and emboss it, to thus produce a counterfeit card. Because of the foregoing simple method of fabrication, counterfeiting is not at all limited to sophisticated counterfeiters but may be accomplished by virtual amateurs having a limited amount of equipment.

In accordance with the present invention, a credit card 22 is produced which essentially contains a coded color pattern which is visible from all edges of the card. In this respect, the improved credit card 22 includes overlaminate layers 20' and 21' of clear polyvinyl chloride which overlie white core material layers 17' of polyvinyl chloride. In addition, the card contains three colored layers of material 23, 24 and 25 of different colors, and such layers, as well as all of the other layers of the card extend throughout the card and are of a sufficient thickness so as to be visible from the edges of the card. Thus, if layer 23 is red, 24 is blue and 25 is yellow, there is a coded color combination visible from the edges of the card which can readily be seen by a person who is accepting the card during a transaction.

It is envisioned that this particular color code might show the northeastern states and that a different code of colors might show the southeastern states and a still different code of colors might represent the west coast, etc. Thus, a merchant receiving a card during a transaction might readily know that the card was or was not issued in his geographical area. Therefore, if the card is being offered in payment of a staple item of merchandise which is not normally purchased by an out-of-area purchaser, the merchant can check further as to the validity of the card. For example, if a purchaser would be offering a card in payment of staple groceries normally used by a local resident with an out-of-area code, the merchant might be suspicious on the basis that the holder of the card is not the type who would normally buy such products out of his area.

It is also envisioned that the materials for layers 23, 24 and 25 might be relatively sophisticated and difficult to obtain on the open market and therefore not readily available. This of itself should cut down on a large amount of the counterfeiting. In addition, it is envisioned that the color code for each area would change every time a new card was issued, which is usually every six months or every year. Therefore, even if the counterfeiters could obtain the layers of materials necessary to duplicate cards already in existance, the fact remains that after the card codes were changed, they would be subjected to the effort of learning new codes, obtaining new materials, and distributing the coded cards in the new areas for which they were coded.

It is also envisioned that while the color coding may be read by eye, sophisticated optical readers may be provided to read the color coding more accurately and automatically provide a go-no-go output relative to accepting a particular card for a transaction.

The card of FIG. 3 is also 30 mils thick and the thickness in mils of the layers from left to right are 3:5:3:4:3:9:3. It is to be understood that the layers in FIG. 3 carrying primed numerals are analogous to the layers with like unprimed numerals in FIG. 2. The printing and embossing is not shown in FIG. 3, but it is to be understood that such printing and embossing forms a part of the card which is fragmentarily shown in FIG. 3.

In FIG. 4 another embodiment of the present invention is shown having white core layers 17" and clear overlaminate layers 20" and 21". These layers are analogous to layers with like numbers with less primes in FIGS. 2 and 3. In addition, the card of FIG. 4 includes colored layers 26, 27 and 29 which are interleafed throughout the extent of the card with plain white layers 30 and 31. The color coding may be, for example, red, green and purple for layers 26, 27 and 29, respectively, while layers 30 and 31 are white. The thickness of the layers in mils from left to right are 3:5:3:3:3:2:3:5:3, for a total thickness of 30 mils. All layers of the cards are of sufficient thickness so as to be visible from the edges of the card.

In FIG. 5 a still further embodiment of the present invention is shown wherein white core layers 17a are provided along with clear overlaminate layers 20a and 21a which are analogous to the layers with like numerals in the preceding figures. In addition, the card of FIG. 5 includes colored layers 32, 33, 34 and 35 which may be of any color desired, for example, black, yellow, green, and orange, respectively, and which are visible from all of the edges. In addition, there is a white layer at 36. The thickness of the layers in mils from left to right are 3:5:3:3:3:2:3:5:3, for a total thickness of 30 mils.

In FIG. 6 a still further embodiment of the present invention is disclosed wherein the credit card includes white core layers 17b and also includes clear overlaminate layers 20b and 21b. As noted previously, these layers are analogous to the layers bearing the like numerals in the preceding embodiments. In addition, the embodiment of FIG. 6 includes a colored layer 37 and a colored layer of a different color 39. For example, these layers may be red and green. Between layers 37 and 39 is a white layer 40 of core material. In addition, the card of FIG. 6 also has a white core layer 41. However, next to core layer 41 is a layer 42, which may also be white or of any other color, and which contains a predetermined metallic content so as to provide a predetermined conductivity. It is envisioned that layers 37, 40, 39 and 41, which extend throughout the card, will provide a predetermined color code which is visually perceptible at all edges of the card. Layer 42 may also be part of this color code. However, layer 42, having a predetermined conductivity, will also provide a go-no-go capability to the card when used in conjunction with an imprinting device which is properly set up to receive it. By making the conductive material 42 of a predetermined conductivity, which is not visually perceptible, the ability of counterfeiters to duplicate this card would be greatly hampered. In addition, the degree of conductivity of layer 42, or of a plurality of layers, such as 42, can be different in different geographical areas of issuance and may be varied periodically as new cards are issued, so that a code would be provided which the impressing devices can be set to unscramble to permit the cards to be used. If an attempt is made to use cards which do not conform to an acceptable code, then the card impressing devices will not accept them. The thickness of the various layers of the card of FIG. 6 in mils from left to right are 3:5:3:3:3:2:3:5:3, for a total of 30 mils.

In FIG. 7 a still further embodiment of the present invention is shown which contains only a single layer 43 of material having metal particles to provide a predetermined conductivity. Layer 43, which extends throughout the card, is located between core layers 17c which in turn are adjacent overlaminate layers 20c and 21c. Layers 17c, 20c and 21c are analogous to like-numbered layers in the preceding embodiment which are either lettered or primed or unprimed. Layer 43, in addition to containing a certain percentage of metal, may also be a predetermined color.

Summarizing, in all of the preceding embodiments, the core layers bearing the numerals 17, whether they are unprimed, primed or lettered, are white, high impact polyvinyl chloride. However, they can be of any other desired color. The overlaminate layers bearing the numerals 20 and 21, whether primed, unprimed or letters, are clear, high impact polyvinyl chloride. The other layers shown in the various cards are either colored, high impact polyvinyl chloride of predetermined thicknesses or white high impact polyvinyl chloride, as specified. It will also be appreciated that the white layers form part of the code with the colored layers, and that all layers of each card extend throughout the card. The layers are all sufficiently thick so that they are visible from all of the edges of the card. However, in certain circumstances, such visibility may be aided by a magnifying glass, or the codes can be read by suitable optical scanning devices. In addition, it will be appreciated that by the use of different colors in different combinations and different thicknesses of layers, practically infinite combinations of codes may be produced.

It will be appreciated that the color coding described above may include the color black or any other color. In addition, the color code may be interfaced with the embossed series of numbers 13 on the card, so that the number of the card may be read from the color code, either visually or by an optical scanning device. Furthermore, for ease in detecting invalid cards, books listing such cards may be set up by color, that is, the pages may be color coded and invalid cards of that color may be listed on such pages.

While various embodiments of the present invention have been disclosed, it will be appreciated that the present invention is not limited thereto but may be otherwise embodied within the scope of the following claims.

What is claimed is:

1. A laminated plastic color coded credit card comprising first layer means of plastic material of a first color extending to a plurality of edges of said card, and second layer means of plastic material of a second color laminated relative to said first layer means and extending to a plurality of edges of said card, said first and second layer means lying in face-to-back relationship and extending continuously throughout a substantial portion of the extent of said plurality of edges of said credit card and being of sufficient thickness so as to be detectable from the edges of said card for providing a coded pattern for identification purposes at the edges of said card, and raised lettering on said card for identifying the holder of said card.

2. A color coded credit card as set forth in claim 1 including third layer means of material of a third color laminated relative to said first and second layer means and extending to all edges of said card and being of sufficient thickness to be visible from all edges of said card.

3. A color coded credit card as set forth in claim 2 including additional layer means of material of a fourth color laminated relative to said first, second, and third layer means, and extending to all edges of said card, said fourth layer means being of sufficient thickness so as to be visible from all edges of said card.

4. A laminated plastic color coded credit card as set forth in claim 1 including third layer means of plastic material for receiving printing extending to all edges of said card, said third layer means being of sufficient thickness so as to be visible from all edges of said card, said first and third layer means being visible from the front and rear of said card as well as from all of the edges thereof.

5. A laminated plastic color coded credit card as set forth in claim 1 wherein said first and second layer means are of different thickness.

6. A laminated plastic color coded credit card as set forth in claim 1 including at least one additional layer means of plastic material of any color extending to the edge of said card in addition to said first and second layer means.

7. A laminated plastic color coded credit card as set forth in claim 1 wherein said first and second layer means extend to all edges of said card.

8. A laminated plastic color coded credit card as set forth in claim 1 including a layer of material containing metal means to provide a predetermined conductivity for identification purposes.

9. A laminated plastic coded credit card as set forth in claim 8 including at least one additional layer means of plastic material of a color different than the other layer means and of visible thickness extending to the edge of said card to thereby provide a coded color pattern at the edge of said card.

10. A laminated plastic color coded credit card comprising a plurality of layer means of plastic material of different colors of visible thickness laminated relative to each other and extending to at least one edge of said card for providing a coded color pattern for identification purposes at said at least one edge of said card, said plurality of layer means extending as continuous colors throughout a substantial portion of the extent of said at least one edge of said credit card, and raised lettering on said card for identifying the holder of said card.

11. A laminated plastic color coded credit card as set forth in claim 10 including first and second layer means of plastic material visible from the front and back of said card, respectively, said first and second layer means being of visible thickness, and printing on said first and second layer means.

* * * * *

UNITED STATES PATENT AND TRADEMARK OFFICE
CERTIFICATE OF CORRECTION

PATENT NO. : 4,223,918

DATED : September 23, 1980

INVENTOR(S) : Frank E. Smoczynski

It is certified that error appears in the above-identified patent and that said Letters Patent are hereby corrected as shown below:

Column 5, line 10, (claim 2), before "color" insert --laminated plastic--;

line 11, before "material" insert --plastic--;

line 16, (claim 3), before "color" insert --laminated plastic--;

line 17, before "material" insert --plastic--.

Signed and Sealed this

Twenty-fifth Day of November 1980

[SEAL]

Attest:

SIDNEY A. DIAMOND

Attesting Officer

Commissioner of Patents and Trademarks